United States Patent [19]
Panyard et al.

[11] Patent Number: 5,776,261
[45] Date of Patent: Jul. 7, 1998

[54] METHOD FOR CLEANING A COMMUTATOR OF AN ELECTRIC MOTOR

[75] Inventors: James Robert Panyard, Livonia; Lawrence William Staley, Ann Arbor, both of Mich.

[73] Assignee: Ford Global Technologies, Inc., Dearborn, Mich.

[21] Appl. No.: 552,445

[22] Filed: Nov. 3, 1995

[51] Int. Cl.⁶ .................. B08B 3/00; B08B 5/00
[52] U.S. Cl. .................. 134/26; 134/30; 134/34; 134/37
[58] Field of Search ................. 134/26, 30, 34, 134/37

[56] References Cited

U.S. PATENT DOCUMENTS

| | | | |
|---|---|---|---|
| 5,039,349 | 8/1991 | Schoeppel | 134/26 |
| 5,240,235 | 8/1993 | Santandrea et al. | 269/50 |
| 5,373,623 | 12/1994 | Santandrea et al. | 29/596 |
| 5,399,204 | 3/1995 | Campo et al. | 134/26 |

*Primary Examiner*—Lyle A. Alexander
*Assistant Examiner*—Alexander Markoff
*Attorney, Agent, or Firm*—Mark S. Sparschu

[57] ABSTRACT

In one embodiment of the present invention, machining chips (34) left in the slots (31) of an end face commutator (28) of a motor's rotor (20) are removed using a high-pressure water spray. The windings (26) of the rotor (20) are substantially shielded from water spray by the rotor (20) being located within a cavity (42) of a pallet carrying the rotor (20). Any water which gets on the windings (26) is dried by a brief application of heated forced air.

5 Claims, 2 Drawing Sheets

1

METHOD FOR CLEANING A COMMUTATOR OF AN ELECTRIC MOTOR

BACKGROUND OF THE INVENTION

1. Field of the Invention

The present invention relates to the field of electric motor manufacture.

2. Description of the Related Art

Some DC electric motors have a commutator located on an end face of the rotor of the motor. The commutator is typically comprised of a plurality of wedge-shaped segments, each separated by a small gap. The commutator segments are coupled to the armature windings of the rotor, as is well-known in the art. Carbon brushes are biased against the commutator, also as is well-known in the art.

In a common method of manufacturing such an end-face commutator, an end face of the rotor is made of copper, but without the aforementioned segments. Slots are then machined in the copper to form the wedge-shaped segments. Subsequent machining can be performed to improve the surface finish of the face of the commutator.

A problem which occurs in the manufacture of an end-face commutator is that in machining the face of the commutator to obtain a better surface finish, machining chips can become tightly lodged in the slots. Because the slots are designed to electrically isolate the commutator segments from one another, chips lodged in the slots have a very detrimental effect on the operation of the motor. Thus, a method to clean the chips from the commutator slots is needed.

In one known cleaning method, a plurality of rotors are placed in a pallet with the end-face commutators facing upward. The pallet is placed in a spray booth. A high-pressure spray of FREON, a chlorofluorocarbon compound, is then applied to the commutators manually by an operator. When the operator believes that all machining chips have been removed from the commutators, he stops spraying.

An advantage of this cleaning method is that the FREON rapidly evaporates, eliminating any doubt about the armature winding having dried after having been soaked by the cleaning process. Operation or electrical testing of a motor with wet windings is to be avoided, as short-circuiting of the windings may occur. A disadvantage of the cleaning method is the expense involved, because FREON is fairly expensive. Another disadvantage is the environmental-unfriendliness attributed to the use of chlorofluorocarbons. A further disadvantage is that this cleaning method sometimes involves removing the rotors from the production line to undergo the cleaning process.

A second method for cleaning a commutator is a "grit-blast" method. Here, the commutator is exposed to a blast of minute plastic pellets. This blast removes the chips from the commutator slots, but the rotor subsequently requires further cleaning to remove any residual plastic pellets. The subsequent cleaning is typically performed by submersion of the rotor in an ultrasonic water bath, followed by a long drying process in an oven to dry the windings of the rotor.

Although generally effective, the "grit-blast" method of cleaning a commutator has several disadvantages. First, the equipment required for the "grit-blast" and the subsequent water cleaning and drying requires a great deal of space on the factory floor. Also, the process is quite slow, requiring the rotors to be removed from the production line to undergo the cleaning process. For the aforementioned reasons, the "grit-blast" method is also quite expensive.

In light of the shortcomings of existing cleaning methods, a commutator cleaning method which can be performed without chlorofluorocarbons; which can be performed quickly, so the rotors can be cleaned in series on the production line; and which requires a relatively small amount of floor space will provide advantages over the prior art.

SUMMARY OF THE INVENTION

The present invention provides a method for cleaning an end-face commutator of a motor, the commutator forming a portion of a rotor of the motor. The method comprises presenting the commutator to a water spray, the water spray smaller in area than the commutator. Further, the method comprises presenting the rotor to at least one stream of heated air.

The present invention also provides a second method for cleaning an end-face commutator of a motor, the commutator forming a portion of a rotor of the motor, and the rotor having an axis of rotation and a periphery extending axially. This method comprises presenting the commutator to a water spray, the water spray smaller in area than the commutator. The periphery of the rotor is substantially shielded from the water spray.

The present invention enables processes for cleaning commutators which eliminate chlorofluorocarbons. Further, the present invention enables processes which are fast, thereby capable of being performed in series on a production line. Also, the present invention enables processes which employ machinery occupying much less floor space than machinery used in alternative processes. In addition to other benefits realized from these improvements, significant cost advantages result from these improvements. For all of these reasons, the present invention provides substantial advantages over the prior art.

DETAILED DESCRIPTION OF THE PREFERRED EMBODIMENT

Figure 1:
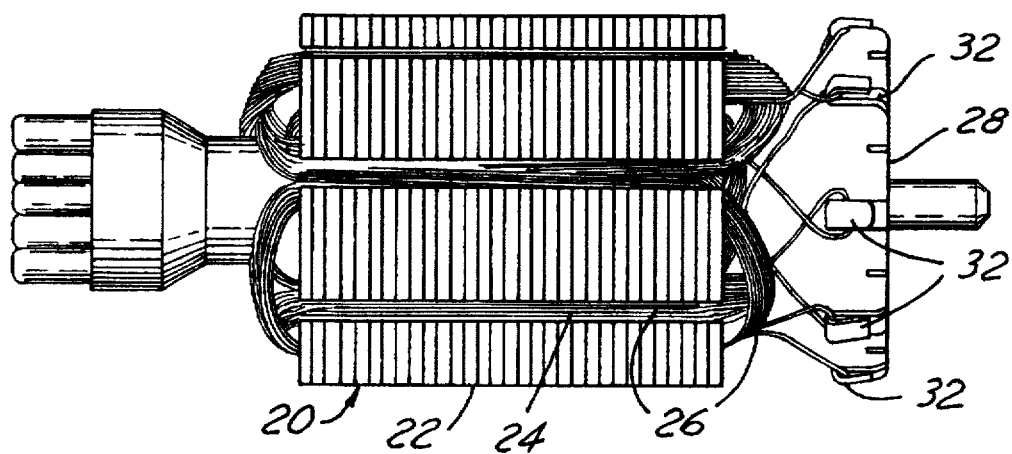
FIG. 1 is a side view of a rotor 20 of a DC electric motor.
Figure 2:
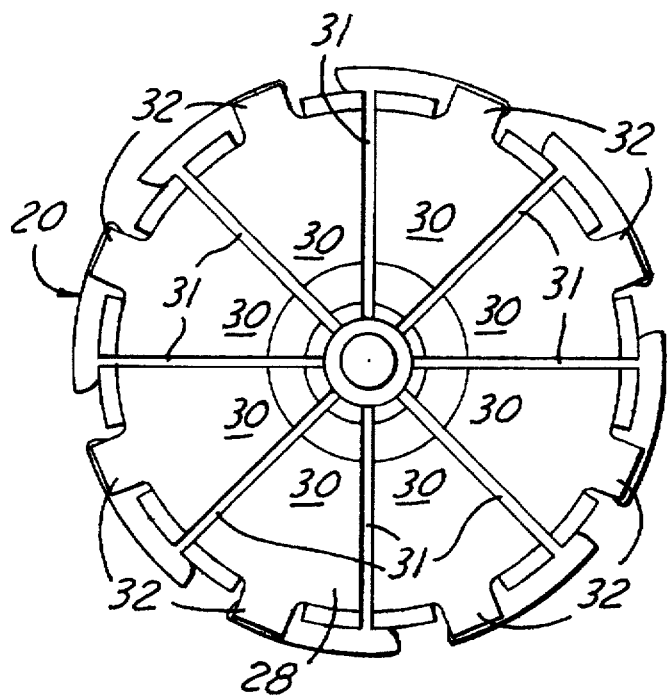
FIG. 2 is an end view of rotor 20, showing end-face commutator 28.

Referring first to FIGS. 1 and 2, a rotor 20 for a DC electric motor such as a small fuel pump motor will be described. The rotor includes a cylindrical armature portion 22 having slots 24. Armature windings 26 are located within and extend out of the ends of slots 24. At an end of rotor 20 is end-face commutator 28. Commutator 28 comprises a plurality of wedge-shaped segments 30 made of an electrical conductor such as copper. Segments 30 are separated by slots 31. At terminals 32, segments 30 are electrically coupled to armature windings 26. When rotor 20 is assembled into a motor, carbon brushes (not shown) are biased against commutator 28, as is well-known in the art.

Figure 3:
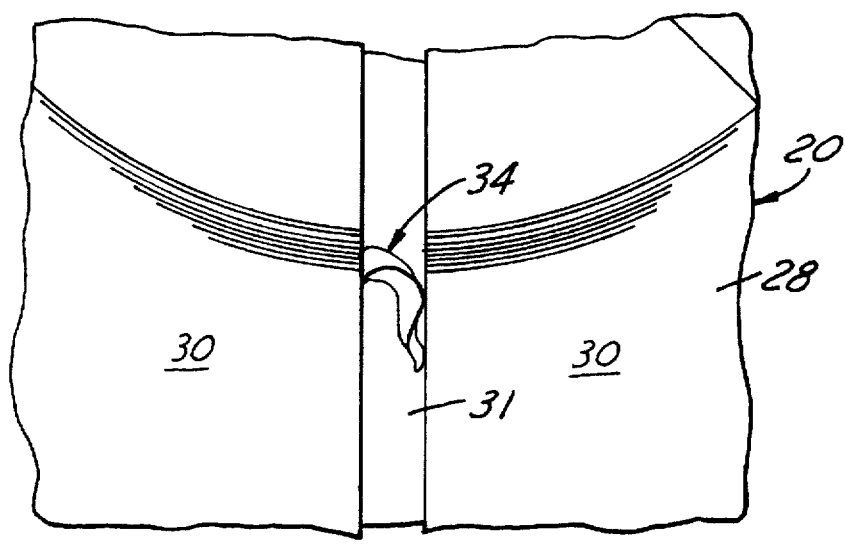
FIG. 3 is a view of a portion of end-face commutator 28, showing a machining chip 34 lodged in a slot 31 of commutator 28.

Refer now additionally to FIG. 3. In a common portion of the process of manufacturing commutator 28, the face of commutator 28 (which comprises segments 30) is machined to improve its surface finish. This machining has the disadvantage of leaving machining chips, such as chips 34, wedged in slots 31. These chips are electrically conductive, thus requiring removal lest they electrically short segments 30 when the motor is operating. The chips can be quite tightly wedged in slots 31, requiring substantial force to remove.

Figure 4:
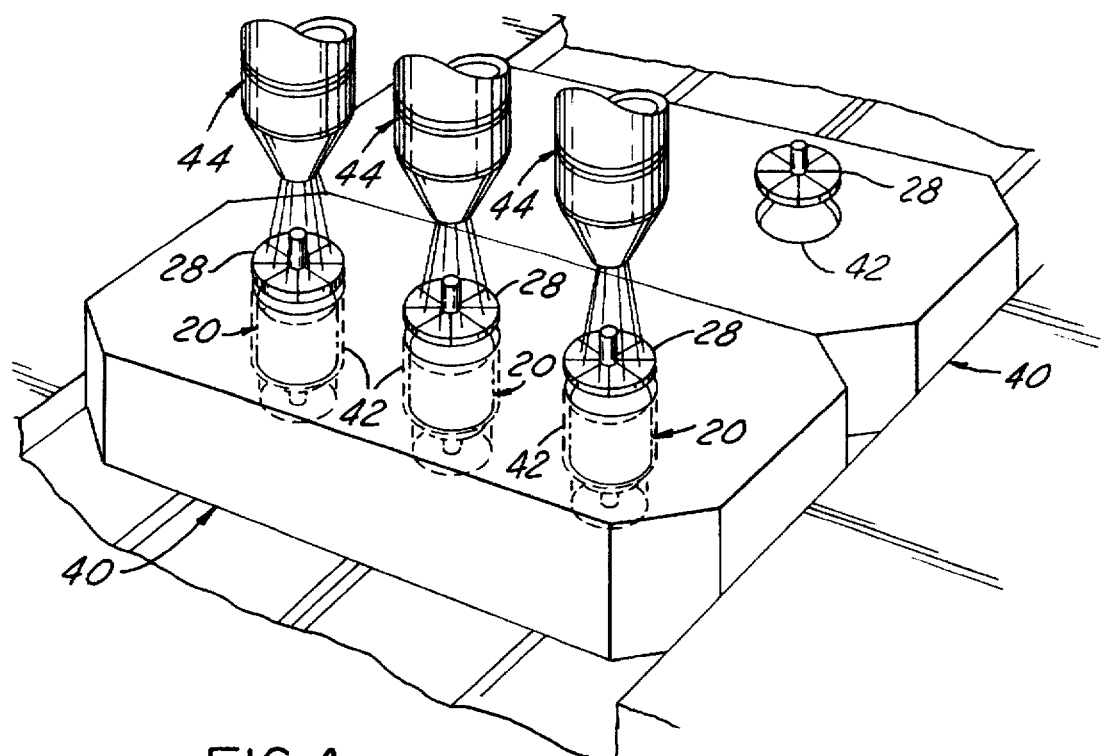
FIG. 4 is a view of a cleaning operation for end-face commutator 28, according to one embodiment of the present invention.

Referring now additionally to FIG. 4, a process for cleaning the commutators 28 will be described. Rotors 20 are placed in pallets 40 with commutators 28 facing upward. Preferably, rotors 20 are placed in pallets 40 by automated means (e.g., a pick-and-place machine). Also, pallets 40 are preferably conveyed by a production line. The cavities in which rotors 20 are placed within pallets 40 are of slightly larger diameter than armatures 22 of rotors 20. Thus, the windings of rotors 20 are largely shielded, while rotors 20 can be easily placed into cavities 42 of pallets 40. The bottoms of cavities 42 are sufficiently open to allow drainage of water from cavities 42.

Spray heads 44 spray water on commutators 28 to clean away any machining chips (such as chips 34) in slots 31. Because the machining chips in slots 31 can be wedged tightly, is it preferred that high pressure water be used. In cleaning a particular commutator 28, it has been found that water pressures between 1000 and 1400 psi are particularly useful. Using lower pressures than needed will potentially leave some machining chips in slots 31. Using higher pressure than needed will tend to require more expensive spray equipment (pumps, valves, etc.) and wear out the spray equipment faster than it would otherwise wear out. Further, using much higher pressure than needed can break commutators 28.

To minimize water overspray onto windings 28 of rotors 20, it is preferred that spray heads 44 provide streams of water of no greater surface area than the surface area of commutators 28. Further, the water is preferably sprayed on the commutators 28 for no longer than necessary. Fifteen seconds is a spray time employed in one implementation of this process. If desired, this spray time can be divided among multiple rows of spray heads 44, so the travel of rotors 20 along the production line will not be delayed by the cleaning process.

Despite best efforts to prevent windings 31 from getting wet in the commutator cleaning process, windings 31 may get exposed to some misting and/or dripping of water. Thus, after the water spray process of FIG. 4, a hot forced air drying process is used.

Figure 5:
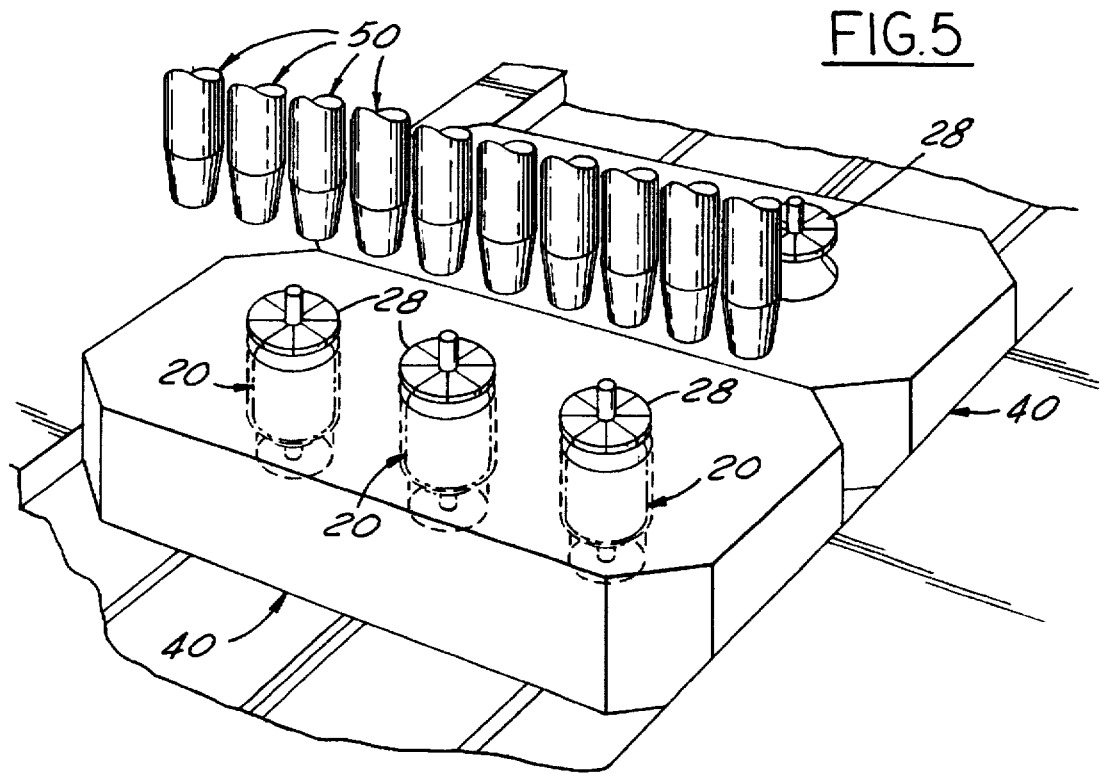
FIG. 5 is a view of a forced-air drying process for rotor 20, performed after the cleaning operation of FIG. 4, according to one embodiment of the present invention.

The hot forced air drying process is illustrated with additional reference to FIG. 5. Pallets 40 carry rotors 20 under streams of hot forced air provided by a bank of nozzles 50. The hot forced air is provided to dry windings 31. In drying one particular rotor 20, it has been found that air temperatures from about 100° F. to about 150° F. are particularly useful. Because windings 31 were at most lightly dampened by the water spray illustrated in FIG. 4, the forced air is preferably provided for only a short period of time. In one implementation of this process, the forced air is provided for 60 seconds. If desired, this drying time can be divided among multiple rows of nozzles 50, so the travel of rotors 20 along the production line will not be delayed by the drying process.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for cleaning an end-face commutator of a motor, said commutator forming a portion of a rotor of said motor, said method comprising:

(a) presenting said commutator to a water spray, said water spray having an area when reaching said commutator less than or equal to a surface area of said commutator facing said spray;

(b) presenting said rotor to at least one stream of air heated above an ambient temperature in a vicinity of said rotor;

wherein said commutator includes at least one slot provided therein;

wherein said water spray cleans machining chips from said at least one slot;

wherein said stream of air is directed substantially axially toward said rotor;

wherein said rotor has a periphery extending axially and wherein said method further comprises substantially shielding said periphery from said water spray by placing said rotor in a cavity of substantially the same shape as said periphery.

2. A method for cleaning an end-face commutator of a motor, said commutator forming a portion of a rotor of said motor, said rotor having an axis of rotation and a periphery extending axially, said method comprising:

presenting said commutator to a water spray, said water spray having an area when reaching said commutator less than or equal to a surface area of said commutator facing said spray; and substantially shielding said periphery from said water spray by placing said rotor in a cavity of substantially the same shape as said periphery.

3. A method as recited in claim 2, further comprising presenting said rotor to at least one stream of air heated above an ambient temperature in a vicinity of said rotor.

4. A method as recited in claim 3, wherein:

said commutator includes at least one slot provided therein; and said water spray cleans machining chips from said at least one slot.

5. A method as recited in claim 4, wherein said at least one stream of air is directed substantially axially toward said rotor.

* * * * *